(No Model.)
J. R. JONES.
TRUSS.
No. 343,816. Patented June 15, 1886.
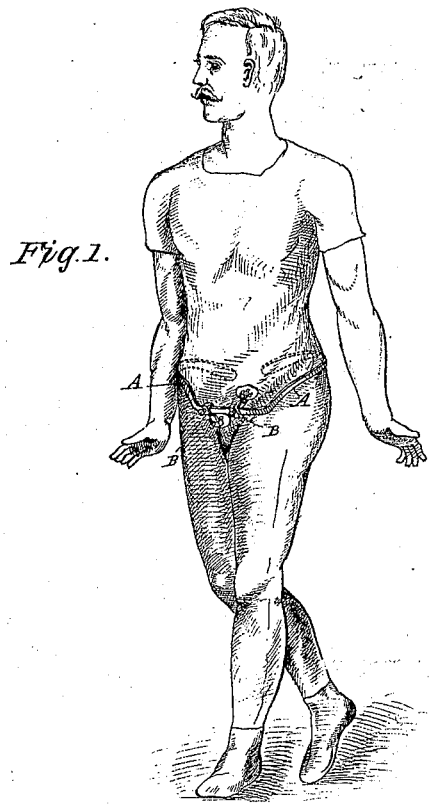
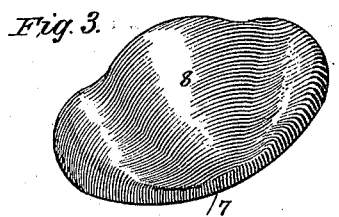
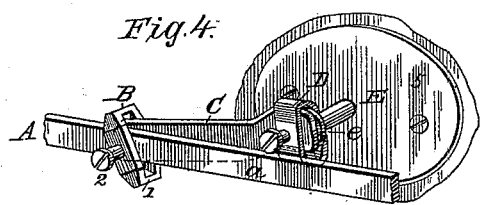
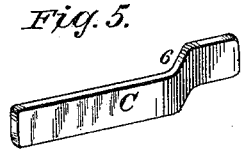
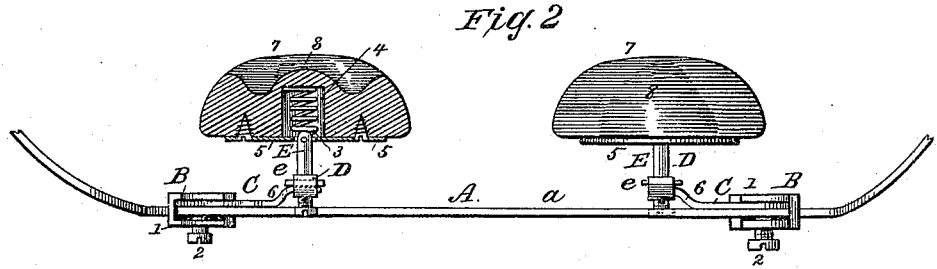
WITNESSES:
Fred G. Dieterich
P. B. Turpin
INVENTOR:
John R. Jones
BY Munn & Co.
ATTORNEYS.

UNITED STATES PATENT OFFICE.

JOHN R. JONES, OF EMPORIA, KANSAS.

TRUSS.

SPECIFICATION forming part of Letters Patent No. 343,816, dated June 15, 1886.

Application filed April 7, 1886. Serial No. 198,138. (No model.)

*To all whom it may concern:*

Be it known that I, JOHN R. JONES, of Emporia, in the county of Lyon and State of Kansas, have invented a new and useful Improvement in Trusses, of which the following is a specification.

In the drawings, Figure 1 is a perspective view of my truss. Fig. 2 is a top plan view of the front portion of the body-spring, the pad-supporting devices being shown thereon, and one of the pads being shown in section. Fig. 3 is a perspective face view of the pad. Fig. 4 is a detail view showing the pad-supporting arm, the pad, and the clamp for connecting the pad-arm and stem; and Fig. 5 is a detail view of the pad-supporting arm.

The invention is an improvement in trusses; and it consists in certain novel constructions and combinations and arrangement of parts, as will be described.

The body-spring A, which in the present instance constitutes the support for the pad-arm, may be made of flat spring metal, of sufficient thickness to give the necessary pressure. The ends of this spring may be padded, and, in fact, it may be padded its full length, except where it supports the clamps for the pad-arms. This portion *a*, for supporting the pad-arms, is usually formed straight, as shown. On this portion *a* is placed the clamp B, having a box, 1, and a binding-screw, 2. The box fits over the body-spring, and is made wider than the same, so it may be oscillated thereon when screw 2 is released. By means of such oscillation the clamp may be adjusted to permit the pad-arm which it secures to be set at any point in a circle described from said clamp as a center. Thus the truss may be accurately adjusted to the injury, be it anywhere within the radius, and the same truss may consequently be used with equal facility for either direct, oblique, or femoral hernia. The pad-supporting arm C has one end fitted into the box 1, between the same and the body spring or support, and is, when the screw 2 is tightened, held rigidly to the support. At its opposite end the arm supports the pad, which is preferably connected therewith by the clamp D, fitting over the arm C, and the head *e* of the pad-stem E, which latter is preferably connected with the pad through the medium of a spring, 3, fitting into a socket, 4, formed in the pad and covered by a plate, 5. By means of this clamp the pad may be set rotarily on the arm, and so secured in any suitable position. Between its ends the arm C is bent at 6 inwardly, so as to hold the pad clear of the body-spring.

I form the face or bearing-surface of the pad with a longitudinal ridge, 7, and the transverse ridge 8. The longitudinal ridge is placed on the upper margin of the opening, and the transverse ridge brings the external abdominal parietes in contact with the edges of the wound, thus aiding union.

By uniting the pad-arm rigidly to the body-spring I am able to transfer the pressure of such spring directly to the pad.

I prefer in practice to use two pads, to equalize the pressure, whether the injury be single or double.

While it is preferred to form the pad as before described, for the reason stated, it is manifest such pad might be made plain or ovoid, as may be desired.

The truss may also be used for umbilical rupture, in which case the pad-carrying arm would be made longer and bent to conform to the shape of the wearer.

In use for umbilical rupture a single clamp may be used for securing both pad-arms to the body-spring.

Having thus described my invention, what I claim as new is—

The combination of a body-spring, a supporting-arm provided at one end with a pad, and a clamp whereby to secure the opposite end of the arm to the body-spring, said clamp being made wider than the body-spring, whereby it may be oscillated thereon to permit the desired adjustments of the pad-supporting arm, substantially as set forth.

JOHN R. JONES.

Witnesses:
M. D. WEAVER,
JOHN J. EDWARDS.